United States Patent
Lee et al.

(10) Patent No.: US 8,852,782 B2
(45) Date of Patent: Oct. 7, 2014

(54) BATTERY PACK HAVING NOVEL STRUCTURE

(71) Applicant: LG Chem, Ltd., Seoul (KR)

(72) Inventors: Jin Kyu Lee, Daejeon (KR); BumHyun Lee, Seoul (KR); DalMo Kang, Daejeon (KR); SangYoon Jeong, Daejeon (KR); Min Chul Jang, Daejeon (KR); Jong Moon Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/747,072

(22) Filed: Jan. 22, 2013

(65) Prior Publication Data

US 2013/0130076 A1 May 23, 2013

Related U.S. Application Data

(63) Continuation of application No. PCT/KR2011/076187, filed on Aug. 2, 2011.

(30) Foreign Application Priority Data

Aug. 9, 2010 (KR) .................. 10-2010-0076187

(51) Int. Cl.

| H01M 10/50 | (2006.01) |
| B60L 11/18 | (2006.01) |
| H01M 10/48 | (2006.01) |
| H01M 10/656 | (2014.01) |
| H01M 10/625 | (2014.01) |
| F16K 11/085 | (2006.01) |
| H01M 10/63 | (2014.01) |
| H01M 2/10 | (2006.01) |
| H01M 10/617 | (2014.01) |
| H01M 10/052 | (2010.01) |
| H01M 10/6568 | (2014.01) |

(52) U.S. Cl.
CPC ......... *H01M 10/502* (2013.01); *B60L 11/1879* (2013.01); *H01M 10/486* (2013.01); *Y02T 10/7005* (2013.01); *H01M 10/5061* (2013.01); *H01M 10/5016* (2013.01); *Y02T 10/7011* (2013.01); *F16K 11/0856* (2013.01); *B60L 11/187* (2013.01); *H01M 2/1077* (2013.01); *H01M 10/5008* (2013.01); *H01M 10/052* (2013.01); *Y02T 10/705* (2013.01); *H01M 10/5077* (2013.01); *Y02E 60/122* (2013.01); *B60L 11/1875* (2013.01); *B60L 2240/545* (2013.01); *B60L 11/1874* (2013.01)
USPC ....................................................... 429/120

(58) Field of Classification Search
USPC ..................... 429/62, 72, 120, 148
See application file for complete search history.

(56) References Cited

U.S. PATENT DOCUMENTS

| 5,215,834 | A | * | 6/1993 | Reher et al. ............. | 429/62 |
| 2004/0137313 | A1 | * | 7/2004 | Jaura et al. ............. | 429/62 |

(Continued)

FOREIGN PATENT DOCUMENTS

| DE | 3727467 A1 | 3/1989 |
| JP | 2002-141086 A | 5/2002 |

(Continued)

OTHER PUBLICATIONS

International Search Report issued in PCT/KR2011/005677, mailed on Apr. 4, 2012.

*Primary Examiner* — Maria J Laios

(74) *Attorney, Agent, or Firm* — Birch, Stewart, Kolasch & Birch, LLP

(57) ABSTRACT

Disclosed herein is a battery pack, temperature of which is controllable, including at least one battery module including a plurality of battery cells or unit modules ('unit cells') which can be charged and discharged, a fluid channel formed such that a fluid to cool or heat the battery module passes through the battery module, a flow change unit located on the fluid channel to change a flow direction of the fluid based on a temperature state of the battery module, and an operation controller to control an operation of the flow change unit based on information regarding the temperature of the battery module.

14 Claims, 5 Drawing Sheets

(56) References Cited

U.S. PATENT DOCUMENTS

| | | |
|---|---|---|
| 2007/0077474 A1 | 4/2007 | Goebel |
| 2009/0220853 A1* | 9/2009 | Yang et al. .................... 429/159 |

FOREIGN PATENT DOCUMENTS

| | | |
|---|---|---|
| JP | 2002-171685 A | 6/2002 |
| JP | 2004-63118 A | 2/2004 |
| JP | 2006-318704 A | 11/2006 |
| JP | 2007-87779 A | 4/2007 |
| JP | 2007-103373 A | 4/2007 |
| JP | 2007-179944 A | 7/2007 |
| JP | 2008-226475 A | 9/2008 |
| JP | 2009-245802 A | 10/2009 |
| KR | 10-2007-0112489 A | 11/2007 |
| KR | 10-2007-0112490 A | 11/2007 |

* cited by examiner

BATTERY PACK HAVING NOVEL STRUCTURE

CROSS REFERENCE TO RELATED APPLICATIONS

This application is a Continuation of PCT International Application No. PCT/KR2011/005677 filed on Aug. 2, 2011, which claims priority under 35 U.S.C. §119(a) to Patent Application No. 10-2010-0076187 filed in the Republic of Korea on Aug. 9, 2010, all of which are hereby expressly incorporated by reference into the present application.

TECHNICAL FIELD

The present invention relates to a battery pack having a novel structure, and, more particularly, to a battery pack, temperature of which is controllable, including at least one battery module including a plurality of battery cells or unit modules ('unit cells') which can be charged and discharged, a fluid channel formed such that a fluid to cool or heat the battery module passes through the battery module, a flow change unit located on the fluid channel to change a flow direction of the fluid based on a temperature state of the battery module, and an operation controller to control an operation of the flow change unit based on information regarding the temperature of the battery module.

BACKGROUND ART

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to one another because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the pouch-shaped battery is lightweight, the manufacturing costs of the pouch-shaped battery are low, and it is easy to modify the shape of the pouch-shaped battery.

In order for the middle or large-sized battery module to provide power and capacity required by a predetermined apparatus or device, it is necessary for the middle or large-sized battery module to be configured to have a structure in which a plurality of battery cells is electrically connected in series to each other, and the battery cells are stable against external force.

Also, battery cells constituting such a middle or large-sized battery module are secondary batteries which can be charged and discharged. Consequently, a large amount of heat is generated from the high-power, large-capacity secondary batteries during the charge and discharge of the batteries. If heat, generated from unit cells during the charge and discharge of the unit cells, is not effectively removed from the battery module, the heat accumulates in the battery module with the result that deterioration of the unit cells is accelerated. According to circumstances, the battery module may catch fire or explode. For this reason, a cooling system is needed in a battery pack for vehicles, which is a high-power, large-capacity battery, to cool battery cells mounted in the battery pack.

Meanwhile, in a case in which a battery module or a battery pack including plate-shaped battery cells, each of which has an electrode assembly of a cathode/separator/anode structure mounted in a battery case formed of a laminate sheet including a resin layer and a metal layer, is used as a battery for vehicles, such as hybrid electric vehicles (HEV), plug-in hybrid electric vehicles (PHEV), and electric vehicles (EV), it is necessary to guarantee long lifespan of the battery cells. To this end, a cooling system to maintain the battery cells at a specific temperature or less is provided. Also, it is necessary to maintain temperature deviation between the battery cells at a specific range or less, thereby reducing deterioration deviation between the battery cells and thus preventing abrupt lowering in performance of the battery pack.

In a cooling mode using a gas, such as air, a cooling channel is lengthened, and therefore, the temperature of the air is increased during cooling, resulting in great temperature difference between the battery cell located at the front part of the battery pack and the battery cell located at the rear part of the battery pack. In particular, recently, various shapes of battery packs have been required based on installation conditions of an external device. For a battery pack configured by stacking two or more battery modules, the temperature difference between battery cells is greatly increased if the same cooling channel as in the conventional battery pack is used.

Also, in a case in which the battery cells are stacked along the cooling channel, air introduced into the battery pack gradually rises while cooling the surfaces of the battery cells as the length of the cooling channel is increased, resulting in great temperature difference between the battery cell located at the front part of the battery pack and the battery cell located at the rear part of the battery pack. That is, the internal resistance deviation between the battery cells and the deterioration deviation between the battery cells are caused due to the temperature difference between the battery cells with the result that overall performance of the battery pack is greatly affected. Also, overall performance of the battery pack is dependent upon the performance of the most deteriorated battery cell.

Consequently, there is a high necessity for a battery pack configured to have a specific structure using a cooling system that is capable of achieving uniform flow of a fluid and reducing temperature deviation as needed.

Such temperature control is necessary not only for a cooling system which removes heat but also for a heating system which supplies heat to solve overcooling.

DISCLOSURE

Technical Problem

Therefore, the present invention has been made to solve the above problems and other technical problems that have yet to be resolved.

As a result of a variety of extensive and intensive studies and experiments on a battery pack, the inventors of the present application have discovered that, in a case in which a flow change unit to change the flow direction of a fluid based on the temperature of a battery module is located on a fluid channel, it is possible to uniformly maintain the temperature of the battery pack using only the flow change unit without great change in structure of the battery pack, thereby greatly improving the performance and lifespan of the battery pack. The present invention has been completed based on these findings.

Technical Solution

In accordance with one aspect of the present invention, the above and other objects can be accomplished by the provision of a battery pack, temperature of which is controllable, including at least one battery module including a plurality of battery cells or unit modules ('unit cells') which can be charged and discharged, a fluid channel formed such that a fluid to cool or heat the battery module passes through the battery module, a flow change unit located on the fluid channel to change a flow direction of the fluid based on a temperature state of the battery module, and an operation controller to control an operation of the flow change unit based on information regarding the temperature of the battery module.

That is, in the battery pack according to the present invention, the flow change unit is located on the fluid channel to change the flow direction of the fluid based on the temperature state of the battery module, and therefore, it is possible to uniformly maintain the temperature of the battery pack using only the flow change unit without great change in structure of the battery pack.

Specifically, a battery pack cooling system to change a cooling flow direction in the battery pack may be configured by adding the flow change unit without change of a final inlet port and a final outlet port, thereby reducing temperature deviation between the battery cells.

Also, the cooling direction may be flexibly changed based on the temperature difference between the battery cell located at the front part of the battery module and the battery cell located at the rear part of the battery module, thereby maintaining a desired temperature deviation between battery cells at high accuracy.

Furthermore, a method of stacking battery modules in design of a battery pack is generally limited in terms of a mechanically stable system configuration and a reliable cooling system configuration. The battery pack according to the present invention may configure a reliable cooling system irrespective of the stacked structure of the battery modules, thereby easily securing flexibility in designing the battery pack.

Meanwhile, each of the battery modules constituting the battery pack according to the present invention is manufactured by stacking a plurality of unit cells with high integration. The unit cells are stacked at predetermined intervals such that heat generated during charge and discharge of the unit cells can be removed and/or overcooled battery modules can be properly heated. For example, the battery cells may be sequentially stacked while being arranged at predetermined intervals without using an additional member(s). For battery cells exhibiting low mechanical strength, a combination of one or more battery cells is mounted in a predetermined mounting member, and a plurality of mounting members are stacked to constitute a battery module. In the latter case, the battery module is referred to as a 'unit module'.

In a case in which a plurality of unit modules is stacked to constitute a battery module, fluid channels are formed between the battery cells and/or the unit modules such that heat accumulated between the stacked battery cells can be effectively removed and/or an overcooled state of the battery module can be solved.

In a preferred example, the fluid channel may be configured to have a structure including a first channel, through which a fluid from the outside is introduced into the flow change unit, a second channel, through which the fluid from the flow change unit is discharged to the outside, a third channel, through which the fluid from the flow change unit is introduced into the battery module, and a fourth channel, through which the fluid from the battery module is discharged to the flow change unit.

In the above structure, the third channel and the fourth channel are opposite to each other about the battery module. Consequently, the fluid introduced through the third channel may cool or heat the battery module while passing through the battery module and may then be discharged through the fourth channel. Alternatively, the fluid introduced through the fourth channel may cool or heat the battery module while passing through the battery module and may then be discharged through the third channel.

The flow change unit may select a connection mode (a) for connection between the first channel and the third channel and connection between the second channel and the fourth channel or a connection mode (b) for connection between the first channel and the fourth channel and connection between the second channel and the third channel to decide the flow direction of the fluid.

In a concrete example, the flow change unit may maintain the connection mode (a) in a normal state such that a fluid is introduced into the front part of the battery module and flows to the rear part of the battery module, and, in a case in which the temperature of the battery cell located at the rear part of the battery module deviates from that of the battery cell located at the front part of the battery module by more than a predetermined value, the flow change unit may select the connection mode (b) to change the flow direction of the fluid such that the fluid is introduced into the rear part of the battery module and flows to the front part of the battery module.

In a preferred example, the flow change unit may include a stationary part including an external inlet port connected to the first channel, an external outlet port connected to the second channel, an internal inlet port connected to the third channel, and an internal outlet port connected to the fourth channel and a rotating part rotatably mounted in the stationary part, the rotating part including a first communication port capable of communicating with the external inlet port and the internal inlet port of the stationary part, a second communication port capable of communicating with the external outlet port and the internal outlet port of the stationary part, a third communication port capable of communicating with the external inlet port and the internal outlet port of the stationary part, and a fourth communication port capable of communicating with the external outlet port and the internal inlet port of the stationary part, the rotating part being configured to have a structure in which only the first communication port and the second communication port communicate with the inlet ports and the outlet ports in the connection mode (a), and only the third communication port and the fourth communication port communicate with the inlet ports and the outlet ports in the connection mode (b).

The rotating part may be configured to have a cylindrical structure and may be vertically inserted into the stationary part from above the stationary part. In a concrete example, the first communication port and the second communication port may be formed in the shape of a through hole horizontally extending through the rotating part, and the third communication port and the fourth communication port may be formed along an outer circumference of the rotating part at an interface between the rotating part and the stationary part in the shape of a groove.

For example, the external inlet port and the external outlet port may be formed at one side of the stationary part, the internal inlet port and the internal outlet port may be formed at the other side of the stationary part, and change from the connection mode (a) to the connection mode (b) may be performed when the rotating part is rotated 90 degrees.

When the temperature difference between the unit cell adjacent to the third channel and the unit cell adjacent to the fourth channel is a predetermined value or more, the operation controller may control the flow change unit.

For example, when the temperature difference between the unit cell adjacent to the third channel and the unit cell adjacent to the fourth channel is 3 to 7° C. or more, a cooling or heating system of the battery pack may be configured such that the operation controller controls the flow change unit to change the flow direction of the fluid in the third channel and the fourth channel.

In the above concrete example, drive force to enable the fluid to flow may be provided in various manners. For example, the drive force may be provided by a pump, and the pump may be selectively located on an arbitrary channel.

The structure of the above concrete example is configured such that introduction and discharge directions of the fluid with respect to the battery module are changed only by the operation of the flow change unit in a state in which introduction and discharge directions of the fluid with respect to the battery pack are not changed. Consequently, the structure of the battery pack is not changed, and therefore, the structure of the above concrete example may be flexibly applied to the conventional battery pack.

In another preferred example, the flow change unit may be configured to have a structure including a variable pump to change the flow direction of a fluid. Specifically, the first channel and the third channel may communicate with each other, the second channel and the fourth channel may communicate with each other, and the variable pump to provide drive force to enable the fluid to flow may select an operation mode (c) in which the fluid flow from the first channel to the third channel and from the fourth channel to the second channel or an operation mode (d) in which the fluid flow from the second channel to the fourth channel and from the third channel to the first channel to decide the flow direction of the fluid.

When the flow of the fluid between the first channel and the third channel or between the second channel and the fourth channel is set, the flow of the fluid between the second channel and the fourth channel or between the first channel and the third channel is automatically set. Consequently, the variable pump may be installed between the first channel and the third channel or between the second channel and the fourth channel. According to circumstances, variable pumps may be installed between the first channel and the third channel and between the second channel and the fourth channel, respectively.

A condition to decide the flow direction of the fluid in the flow change unit including the variable pump may include, for example, a case in which the temperature difference between the unit cell adjacent to the third channel and the unit cell adjacent to the fourth channel is a predetermined value or more as previously described.

In the present invention, the fluid is not particularly restricted so long as the fluid is a material that is capable of transmitting heat for cooling or heating. Representative examples of the fluid may include air and water.

In a preferred example, the unit cells may be mounted in a module case.

The unit cells may be stacked in a lateral direction, and the module case may be provided at the upper part and the lower part thereof with a fluid inlet port and a fluid outlet port, respectively, through which the fluid flows in a direction perpendicular to the stacked direction of the unit cells.

For a battery module having unit cells stacked in the lateral direction, the temperature of the unit cell located at the rear part of the battery module may become higher than that of the unit cell located at the front part of the battery module as the stacked length is increased.

On the other hand, the battery pack according to the present invention includes the flow change unit that is capable of changing the flow directions of the fluid introduced into and discharged from the battery module as needed, and therefore, it is possible to easily solve the problems caused in a battery pack having the aforementioned conventional structure.

In a preferred example of the above structure, the module case may be configured to have a structure having a flow space ('fluid introduction part') extending from the fluid inlet port to the unit cell stack and a flow space ('fluid discharge part') extending from the unit cell stack to the fluid outlet port.

The fluid introduction part and the fluid discharge part are flow spaces, into and from which a fluid to effectively remove or apply heat generated from the battery cells during the charge and discharge of the battery cells is introduced and discharged. The fluid introduction part and the fluid discharge part are formed at the upper part and the lower part of the module case, respectively, in opposite directions. According to circumstances, the fluid introduction part and the fluid discharge part may be formed at the lower part and the upper part of the module case, respectively.

Each of the battery cells may be a secondary battery, such as a nickel metal hydride secondary battery or a lithium secondary battery. The lithium secondary battery is particularly preferably used since the lithium secondary battery has high energy density and discharge voltage. Based on the shape thereof, a prismatic battery or a pouch-shaped battery is preferably used as a chargeable and dischargeable unit cell constituting the battery module.

For reference, the term 'battery module' used in the specification inclusively means the structure of a battery system configured to have a structure in which two or more chargeable and dischargeable battery cells or unit modules are mechanically coupled and, at the same time, electrically connected to each other to provide high power and capacity. Therefore, the battery module itself may constitute a single apparatus or a part of a large-sized apparatus. For example, a large number of small-sized battery modules may be connected to each other to constitute a large-sized battery module. Alternatively, a small number of battery cells may be connected to each other to constitute a unit module, and a plurality of the unit modules may be connected to each other.

Meanwhile, each of the unit modules may have various structures. A preferred example of the unit module will hereinafter be described.

Each of the unit modules may be configured to have a structure in which plate-shaped battery cells, electrode terminals of which are formed at the upper end and the lower end thereof, respectively, or both the electrode terminals of which are formed at one end thereof, are connected in series to each other. Specifically, each of the unit modules may include two or more battery cells, connection portions between the electrode terminals of which are bent to form a stacked structure, and high-strength cell covers coupled to each other to surround outer surfaces of the battery cells excluding the electrode terminals.

Each of the plate-shaped battery cells is a battery cell having small thickness and relatively large width and length so as to minimize the total size of a battery module when the battery cells are stacked to constitute the battery module. In a preferred example, each of the battery cells may be a secondary battery configured to have a structure in which an electrode assembly is mounted in a battery case formed of a laminate sheet including a resin layer and a metal layer, and electrode terminals protrude from the upper and lower ends of the battery case. Specifically, the electrode assembly may be mounted in a pouch-shaped case formed of an aluminum laminate sheet. The secondary battery with the above-described structure may also be referred to as a pouch-shaped battery cell.

Two or more battery cells may be covered by the high-strength cell covers made of a synthetic resin or a metallic material to constitute a unit module. The high-strength cell covers protect the battery cells exhibiting low mechanical strength and restrain the repetitive expansion and contraction fluctuation during the charge and discharge of the battery cells to prevent separation between sealed portions of the battery cells. Consequently, it is possible to manufacture a middle or large-sized battery module exhibiting higher safety.

The battery cells may be connected in series and/or parallel to each other in each of the unit modules or between neighboring unit modules. In a preferred example, the battery cells may be arranged in series in the longitudinal direction so that the electrode terminals of the battery cells are successively adjacent to each other, neighboring electrode terminals of the battery cells are coupled to each other, two or more of the battery cells are overlapped with each other, and a predetermined number of overlapped battery cells are covered by the cell covers to manufacture a plurality of unit modules.

The coupling between the electrode terminals may be achieved using various methods, such as welding, soldering, and mechanical fastening. Preferably, the coupling between the electrode terminals is achieved by welding.

A plurality of battery cells or unit modules, stacked with high integration in a state in which the electrode terminals are connected to each other, may be vertically mounted in separable upper and lower cases that are configured to be coupled to each other, preferably, in the assembly-type coupling structure to constitute a battery module.

The details of a unit module and a battery module manufactured with a plurality of unit modules are disclosed in Korean Patent Application No. 2006-45443 and No. 2006-45444, which have been filed in the name of the applicant of the present application and the disclosure of which is incorporated herein by reference.

The battery pack according to the present invention is preferably used as a power source for electric vehicles, hybrid electric vehicles, or plug-in hybrid electric vehicles, the safety of which may be seriously deteriorated due to extreme heat generated from a plurality of battery cells combined to provide high power and capacity during the charge and discharge of the battery cells and which may be needed to be heated to improve operational efficiency in an overcooled state of the battery pack.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
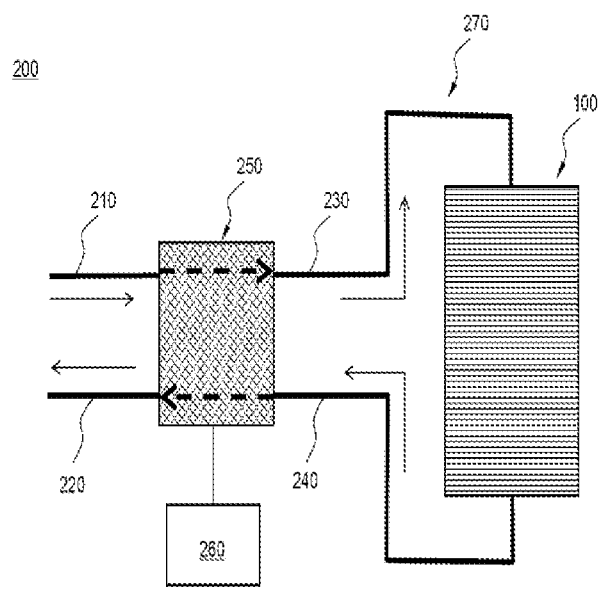
FIG. 1 is a typical view showing a battery pack according to an embodiment of the present invention.

FIG. 1 is a typical view showing a battery pack according to an embodiment of the present invention.

Referring to FIG. 1, a battery pack 200, which is a battery pack configured such that the temperature of the battery pack is controllable, includes a battery module 100, a fluid channel 270, a flow change unit 250, and an operation controller 260.

The battery module 100 includes a plurality of unit modules which can be charged and discharged. The fluid channel 270 is formed such that a fluid to cool or heat the battery module 100 passes through the battery module 100.

The flow change unit 250 is located on the fluid channel 270 to change the flow direction of the fluid based on the temperature of the battery module 100. The operation controller 260 is connected to the flow change unit 250 to control the operation of the flow change unit 250 based on information regarding the temperature of the battery module 100.

Also, the fluid channel 270 includes a first channel 210, through which a fluid from the outside is introduced into the flow change unit 250, a second channel 220, through which the fluid from the flow change unit 250 is discharged to the outside, a third channel 230, through which the fluid from the flow change unit 250 is introduced into the battery module 100, and a fourth channel 240, through which the fluid from the battery module 100 is discharged to the flow change unit 250. The third channel 230 and the fourth channel 240 are opposite to each other about the battery module 100.

Also, the flow change unit 250 selects a connection mode (a) for connection between the first channel 210 and the third channel 230 and connection between the second channel 220 and the fourth channel 240 such that a fluid, introduced via the first channel 210 and the third channel 230, cools or heats the battery module 100 and is then discharged to the outside via the fourth channel 240 and the second channel 220.

Figure 2:
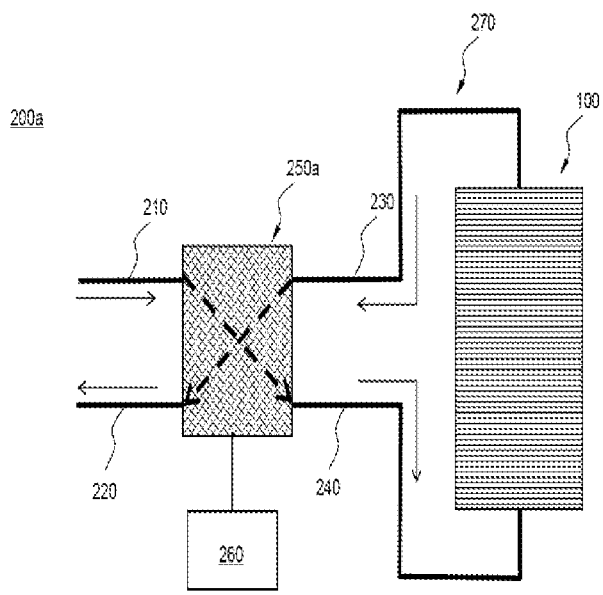
FIG. 2 is a typical view showing a battery pack according to another embodiment of the present invention.

FIG. 2 is a typical view showing a battery pack according to another embodiment of the present invention.

Referring to FIG. 2, a flow change unit 250a selects a connection mode (b) for connection between a first channel 210 and a fourth channel 240 and connection between a second channel 220 and a third channel 230 such that a fluid, introduced via the first channel 210 and the fourth channel 240, cools or heats a battery module 100 and is then discharged to the outside via the third channel 230 and the second channel 220.

Also, when the temperature of the battery module 100 adjacent to the fourth channel 240 is about 5° C. higher than that of the battery module 100 adjacent to the third channel 230, an operation controller 260 controls the flow change unit 250*a* to change the flow direction of the fluid in the same manner as in flow change unit 250 of FIG. 1.

Figure 3:
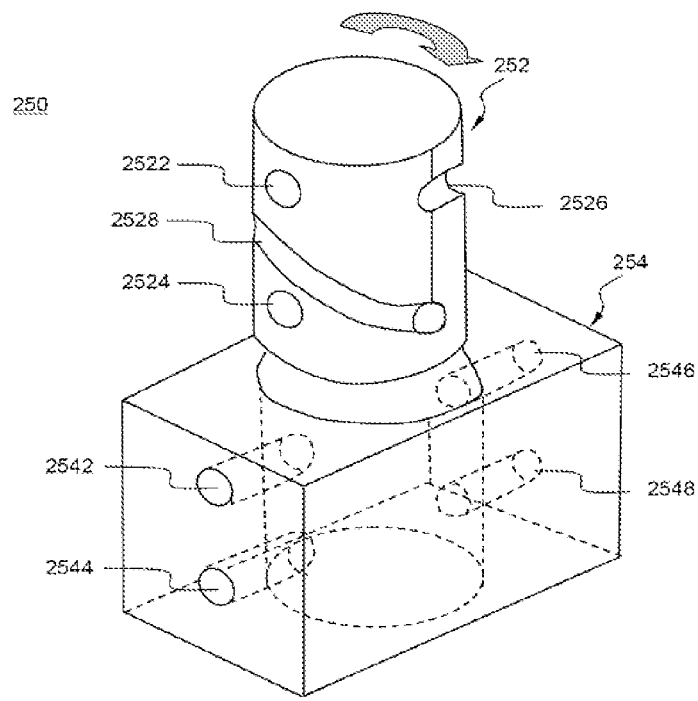
FIGS. 3 and 4 are perspective views showing an embodiment of a flow change unit of FIG. 1.
Figure 4:
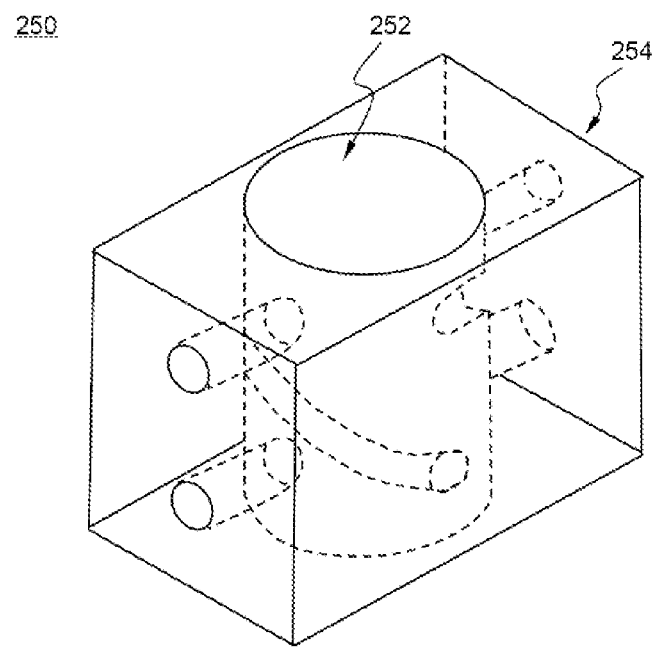

FIGS. 3 and 4 are perspective views typically showing the flow change unit of FIG. 1. Specifically, FIG. 3 shows a state of the flow change unit 250 before a rotating part 252 of the flow change unit 250 is inserted into a stationary part 254 of the flow change unit 250, and FIG. 4 shows a state of the flow change unit 250 after the rotating part 252 of the flow change unit 250 is inserted into the stationary part 254 of the flow change unit 250.

Referring to these drawings together with FIG. 1, the flow change unit 250 includes the stationary part 254 and the rotating part 252. The stationary part 254 includes an external inlet port 2542 connected to the first channel 210, an external outlet port 2544 connected to the second channel 220, an internal inlet port 2546 connected to the third channel 230, and an internal outlet port 2548 connected to the fourth channel 240.

The rotating part 252 is rotatably mounted in the stationary part 254. The rotating part 252 includes a first communication port 2522 communicating with the external inlet port 2542 and the internal inlet port 2546 of the stationary part 254 and a second communication port 2524 communicating with the external outlet port 2544 and the internal outlet port 2548 of the stationary part 254.

Also, the rotating part 252 is configured to have a cylindrical structure and is vertically inserted into the stationary part 254 from above the stationary part 254. In the connection mode (a), only the first communication port 2522 and the second communication port 2524 communicate with the inlet ports 2542 and 2546 and the outlet ports 2544 and 2548.

The first communication port 2522 and the second communication port 2524 are formed in the shape of a through hole horizontally extending through the rotating part 252. A third communication port 2526 and a fourth communication port 2528 are formed along the outer circumference of the rotating part 252 at the interface between the rotating part 252 and the stationary part 254 in the shape of a groove.

Figure 5:
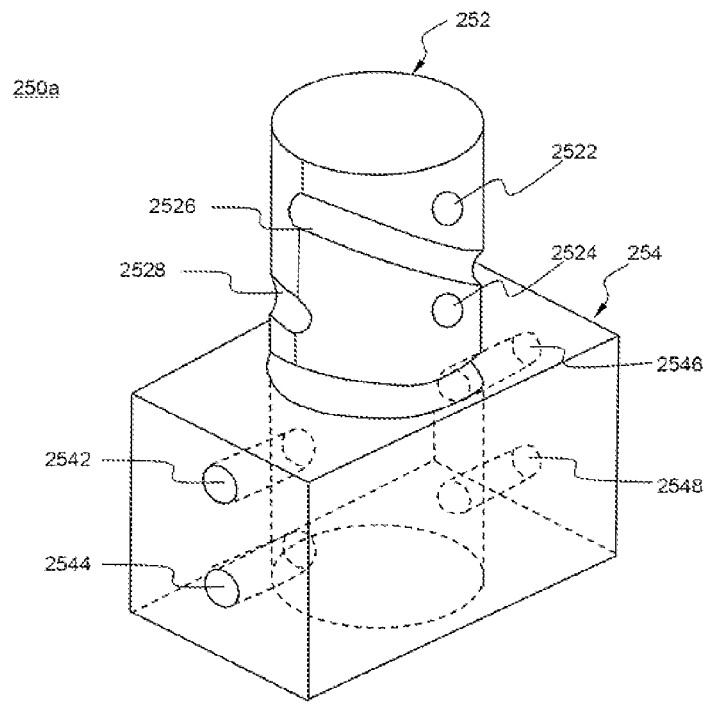
FIGS. 5 and 6 are perspective views showing an embodiment of a flow change unit of FIG. 2.
Figure 6:
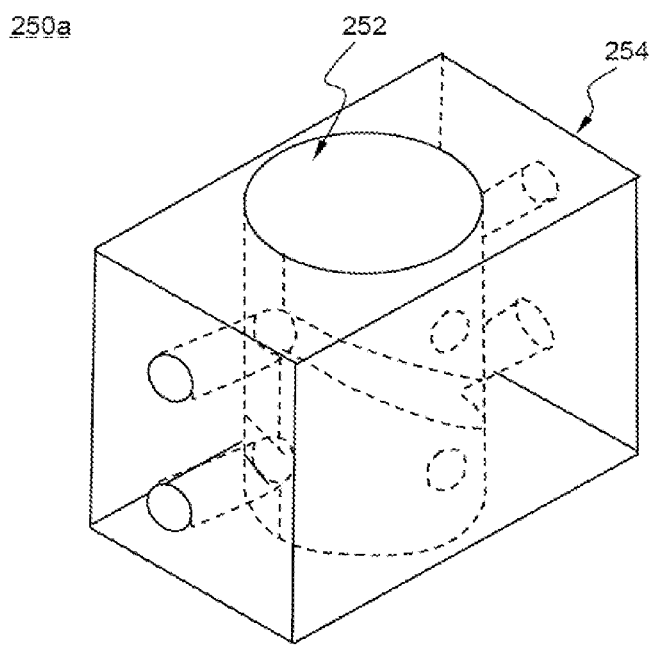

FIGS. 5 and 6 are perspective views showing the flow change unit of FIG. 2. Specifically, FIG. 5 shows a state of the flow change unit 250*a* before a rotating part 252 of the flow change unit 250*a* is inserted into a stationary part 254 of the flow change unit 250*a*, and FIG. 6 shows a state of the flow change unit 250*a* after the rotating part 252 of the flow change unit 250*a* is inserted into the stationary part 254 of the flow change unit 250*a*.

Referring to these drawings together with FIG. 2, the rotating part 252 includes a third communication port 2526 communicating with an external inlet port 2542 and an internal outlet port 2548 of the stationary part 254 and a fourth communication port 2528 communicating with an external outlet port 2544 and an internal inlet port 2546 of the stationary part 254.

Also, the flow change unit 250*a* of FIGS. 5 and 6 is configured to have a structure in which the flow change unit 250 of FIG. 3 is rotated 90 degrees in a direction indicated by a right arrow such that, in the connection mode (b), only the third communication port 2526 and the fourth communication port 2528 of the rotating part 252 communicate with the inlet ports 2542 and 2546 and the outlet ports 2544 and 2548.

Specifically, the external inlet port 2542 and the external outlet port 2544 are formed at one side of the stationary part 254, and the internal inlet port 2546 and the internal outlet port 2548 are formed at the other side of the stationary part 254. When the rotating part 252 is rotated 90 degrees, change from the connection mode (a) to the connection mode (b) is performed.

Figure 7:
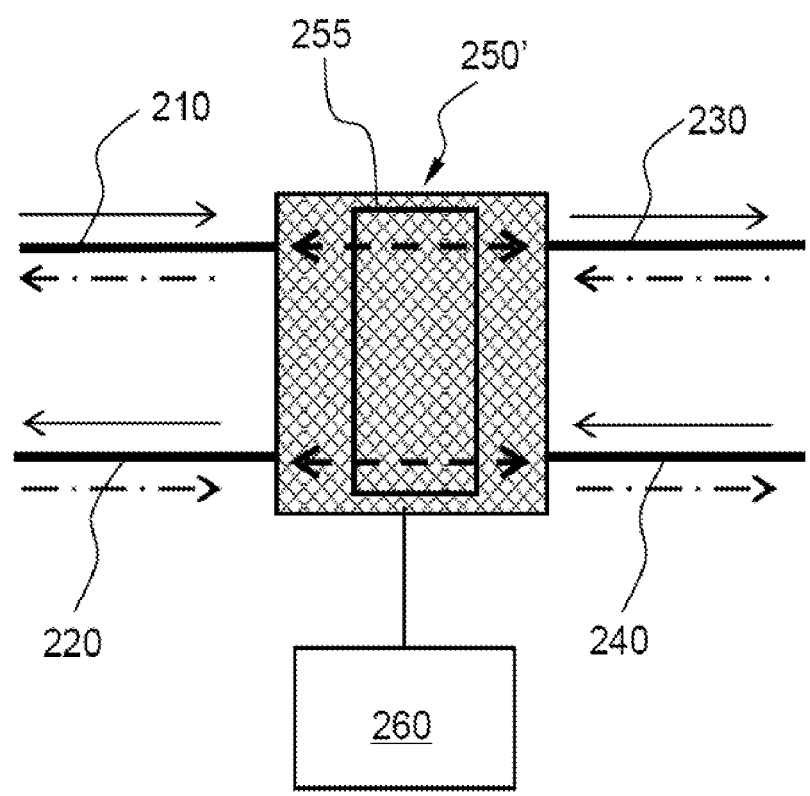
FIG. 7 is a typical view showing a flow change unit according to another embodiment in the battery pack of the present invention.

FIG. 7 is a typical view showing a flow change unit according to another embodiment in the battery pack of the present invention.

Referring to FIG. 7, a flow change unit 250' includes a variable pump 255 to change the flow direction of a fluid. Specifically, the first channel 210 and the third channel 230 communicate with each other, and the second channel 220 and the fourth channel 240 communicate with each other. The variable pump 255 provides drive force to enable the fluid to flow.

The operation controller 260 selects an operation mode (indicated by a solid line) in which the fluid flow from the first channel 210 to the third channel 230 and from the fourth channel 240 to the second channel 220 or another operation mode (indicated by a dashed dotted line) in which the fluid flow from the second channel 220 to the fourth channel 240 and from the third channel 230 to the first channel 210 to decide the flow direction of the fluid.

Conditions to decide the flow direction of the fluid may be identical to those described with reference to FIGS. 1 to 6.

Figure 8:
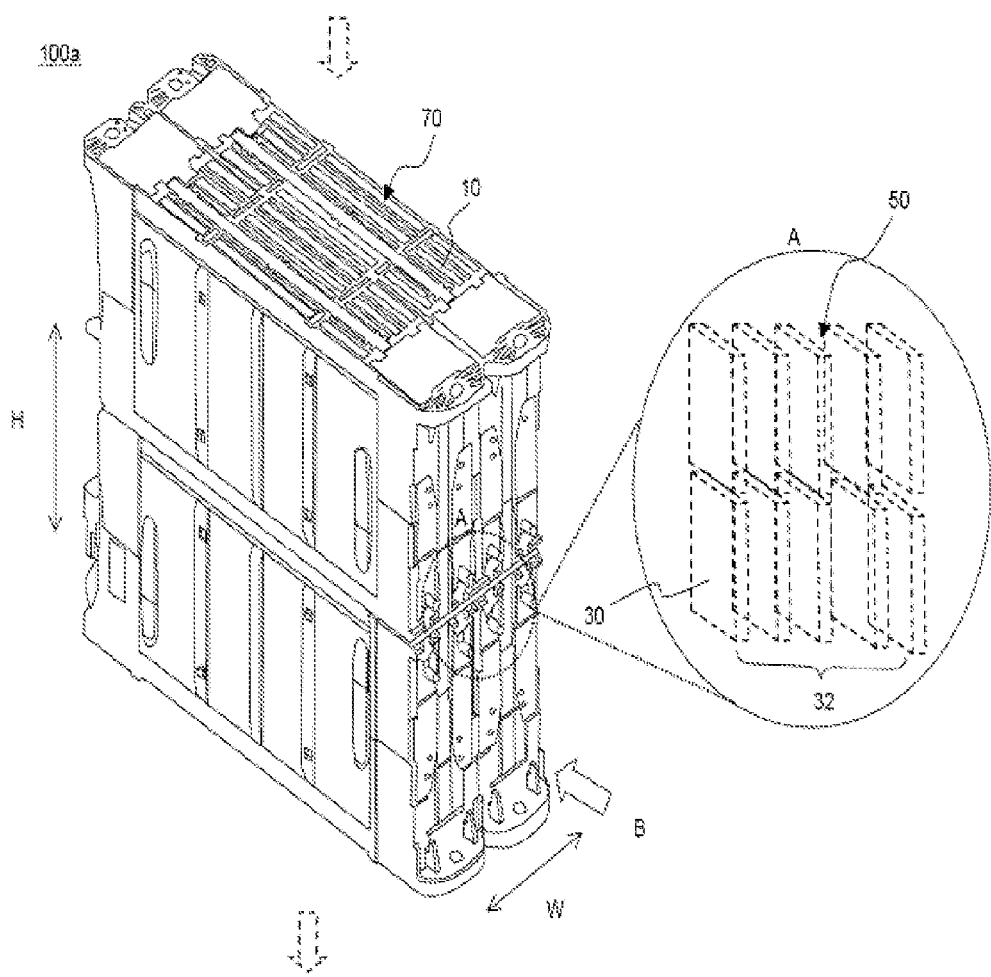
FIG. 8 is a perspective view showing a battery module according to another embodiment of the present invention.

FIG. 8 is a perspective view typically showing a battery module according to another embodiment of the present invention. Part A typically shows a state in which unit modules are stacked when viewed in a direction indicated by an arrow B to illustrate the stacked state of the unit modules in the battery module.

Referring to FIG. 8 together with FIG. 1, the battery module 100*a* includes a unit module stack 32 in which a plurality of unit modules 30 are electrically connected to each other while being stacked in the lateral direction, a module case 70, in which the unit module stack 32 is mounted, a fluid inlet port 10, through which a fluid from the outside is introduced into the battery module 100*a*, and a fluid outlet port (not shown), through which the fluid is discharged from the unit module stack 32.

A fluid, introduced through the fluid inlet port 10, passes through channels 50 formed between the unit modules 30 to cool or heat the unit modules 30 and is then discharged out of the battery module via the fluid outlet port and a flow change unit 250.

In the drawing, two battery modules 100*a* are stacked in a width direction W and a height direction H. However, the stacked number of the battery modules may be increased as needed.

INDUSTRIAL APPLICABILITY

As is apparent from the above description, a battery pack according to the present invention includes a flow change unit located on a fluid channel to change the flow direction of a fluid based on the temperature of a battery module. Consequently, it is possible to uniformly maintain the temperature of the battery pack using only the flow change unit without great change in structure of the battery pack, thereby greatly improving the performance and lifespan of the battery pack.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery pack, temperature of which is controllable, comprising:
   at least one battery module comprising a plurality of battery cells or unit cells which can be charged and discharged;
   a fluid channel formed such that a fluid to cool or heat the battery module passes through the battery module;
   a flow change unit located on the fluid channel to change a flow direction of the fluid based on a temperature state of the battery module; and
   an operation controller to control an operation of the flow change unit based on information regarding the temperature of the battery module,
   wherein the fluid channel comprises:
      a first channel, through which the fluid from an outside is introduced into the flow change unit;
      a second channel, through which the fluid from the flow change unit is discharged to the outside;
      a third channel, through which the fluid from the flow change unit is introduced into the battery module; and
      a fourth channel, through which the fluid from the battery module is discharged to the flow change unit,
   wherein the flow change unit selects a first connection mode for connection between the first channel and the third channel and connection between the second channel and the fourth channel or a second connection mode for connection between the first channel and the fourth channel and connection between the second channel and the third channel to decide the flow direction of the fluid,
   wherein the flow change unit comprises:
      a stationary part comprising:
         an external inlet port connected to the first channel;
         an external outlet port connected to the second channel;
         an internal inlet port connected to the third channel; and
         an internal outlet port connected to the fourth channel; and
      a rotating part rotatably mounted in the stationary part, the rotating part comprising:
         a first communication port capable of communicating with the external inlet port and the internal inlet port of the stationary part;
         a second communication port capable of communicating with the external outlet port and the internal outlet port of the stationary part;
         a third communication port capable of communicating with the external inlet port and the internal outlet port of the stationary part; and
         a fourth communication port capable of communicating with the external outlet port and the internal inlet port of the stationary part, and
      wherein the rotating part is configured to have a structure in which only the first communication port and the second communication port communicate with the inlet ports and the outlet ports in the first connection mode, and only the third communication port and the fourth communication port communicate with the inlet ports and the outlet ports in the second connection mode.

2. The battery pack according to claim 1, wherein the third channel and the fourth channel are opposite to each other about the battery module.

3. The battery pack according to claim 1, wherein the rotating part is configured to have a cylindrical structure and is vertically inserted into the stationary part from above the stationary part.

4. The battery pack according to claim 3, wherein the first communication port and the second communication port are formed in the shape of a through hole horizontally extending through the rotating part, and the third communication port and the fourth communication port are formed along an outer circumference of the rotating part at an interface between the rotating part and the stationary part in the shape of a groove.

5. The battery pack according to claim 4, wherein the external inlet port and the external outlet port are formed at one side of the stationary part, the internal inlet port and the internal outlet port are formed at the other side of the stationary part, and change from the first connection mode to the second connection mode is performed when the rotating part is rotated 90 degrees.

6. The battery pack according to claim 1, wherein, when a temperature difference between a unit cell adjacent to the third channel and a unit cell adjacent to the fourth channel is a predetermined value or more, the operation controller controls the flow change unit.

7. The battery pack according to claim 1, wherein the first channel and the third channel communicate with each other, the second channel and the fourth channel communicate with each other, the flow change unit comprises a variable pump to provide drive force to enable the fluid to flow, and the variable pump selects a third operation mode in which the fluid flow from the first channel to the third channel and from the fourth channel to the second channel or a fourth operation mode in which the fluid flow from the second channel to the fourth channel and from the third channel to the first channel to decide the flow direction of the fluid.

8. The battery pack according to claim 1, wherein the unit cells are mounted in a module case.

9. The battery pack according to claim 8, wherein the unit cells are stacked in a lateral direction, and the module case is provided at an upper part and a lower part thereof with a fluid inlet port and a fluid outlet port, respectively, through which the fluid flows in a direction perpendicular to the stacked direction of the unit cells.

10. The battery pack according to claim 9, wherein the module case has a fluid introduction part extending from the fluid inlet port to the unit cell stack and a fluid discharge part extending from the unit cell stack to the fluid outlet port.

11. The battery pack according to claim 1, wherein each of the battery cells is a lithium secondary battery.

12. The battery pack according to claim 1, wherein each of the unit cells comprises two or more battery cells, electrode terminals of which are connected in series to each other, and a pair of cell covers coupled to each other to surround outer surfaces of the battery cells excluding the electrode terminals.

13. The battery pack according to claim 12, wherein each of the unit cells is configured to have a structure in which two battery cells are mounted in the cell covers made of a metallic material.

14. The battery pack according to claim 1, wherein the battery pack is used as a power source for electric vehicles, hybrid electric vehicles, or plug-in hybrid electric vehicles.

* * * * *

UNITED STATES PATENT AND TRADEMARK OFFICE
CERTIFICATE OF CORRECTION

| | | |
|---|---|---|
| PATENT NO. | : 8,852,782 B2 | Page 1 of 1 |
| APPLICATION NO. | : 13/747072 | |
| DATED | : October 7, 2014 | |
| INVENTOR(S) | : Jin Kyu Lee et al. | |

It is certified that error appears in the above-identified patent and that said Letters Patent is hereby corrected as shown below:

ON THE TITLE PAGE:

At item (63), Related U.S. Application Data, change "Continuation of application No. PCT/KR2011/076187, filed on Aug. 2, 2011" to --Continuation of application No. PCT/KR2011/005677, filed on Aug. 2, 2011--.

Signed and Sealed this
Seventeenth Day of February, 2015

Michelle K. Lee
*Deputy Director of the United States Patent and Trademark Office*